Patented Oct. 11, 1927.

1,645,249

UNITED STATES PATENT OFFICE.

KELLOGG SINCLAIR MACLACHLAN, OF ST. CATHARINES, ONTARIO, CANADA, ASSIGNOR TO LINCOLN PULP AND PAPER COMPANY, LIMITED, OF MERRITTON, CANADA.

METHOD OF PREPARING TRANSPARENT PAPER WITH OPAQUE MARKINGS.

No Drawing.  Application filed May 29, 1926. Serial No. 112,727.

This invention relates to an improved method of preparing transparent paper with opaque markings, and the objects of the invention are to provide a wrapping paper with distinctive marking which may be used, for instance, as a protective wrapper for bottles or other containers which will be difficult to duplicate and may be used to identify the manufacture of particular dealers.

It is old in the art to manufacture transparent or glassine paper from high grade sulphite paper stock by subjecting the same to a super-calendering using pressure of from ten to fifteen tons operation. It is also well known to apply various forms of rubber or water marks to ordinary paper, such rubber or water marks being relatively inconspicuous in the finished paper. I have discovered that if, during the manufacture of transparent or glassine paper, rubber or water marks are formed thereon in the usual way, then the super-calendering operation will, while making the paper transparent, leave the rubber or water marks opaque and thereby impart a distinctive and readily observed marking to the paper.

In carrying out the invention, paper of the same type as that known in the trade as glassine is manufactured in the ordinary way on a Fourdrinier machine from high grade sulphite pulp. During the passage of the paper through the machine, rubber or water markings are formed thereon in the same way as such markings are now formed upon ordinary paper. The paper coming from the Fourdrinier machine is then subjected to a super-calendering operation by passing between a suitable number of highly heated calender rolls under the same conditions as those prevailing in the manufacture of the aforesaid glassine paper. The result of this calendering operation is to impart a certain transparency to the body of the paper while leaving the rubber or water markings opaque. Such opaque markings, which may be of any convenient design, impart a distinctive characteristic to the paper and form of it an effective vehicle for packages, bottles and the like to denote and distinguish the manufacture of a particular dealer and to avoid substitution.

As many changes could be made in the above construction and many apparently widely different embodiments of my invention, within the scope of the claims, constructed without departing from the spirit or scope thereof, it is intended that all matter contained in the accompanying specification and drawings shall be interpreted as illustrative and not in a limiting sense.

What I claim as my invention is:

The herein described method of preparing a transparent paper with opaque markings which comprises first making an opaque paper on a Fourdrinier machine and producing rubber or water markings thereon while passing through the machine, and then subjecting the paper to a super-calendering operation at such a degree of pressure as to render the paper transparent and the markings opaque.

In witness whereof I have hereunto set my hand.

KELLOGG SINCLAIR MACLACHLAN.